United States Patent
Watanabe et al.

(10) Patent No.: US 11,484,859 B2
(45) Date of Patent: Nov. 1, 2022

(54) AIRFLOW GENERATION DEVICE AND MANUFACTURING METHOD FOR SAME

(71) Applicants: ASAHI RUBBER INC., Saitama (JP); TOSHIBA ENERGY SYSTEMS & SOLUTIONS CORPORATION, Kawasaki (JP)

(72) Inventors: Nobuyoshi Watanabe, Saitama (JP); Hideaki Sato, Saitama (JP); Yutaka Watanabe, Saitama (JP); Kenichi Yamazaki, Kawasaki (JP); Masahiro Asayama, Tokyo (JP); Motofumi Tanaka, Tokyo (JP); Hiroyuki Yasui, Kawasaki (JP); Toshiki Osako, Kawasaki (JP)

(73) Assignees: ASAHI RUBBER INC., Saitama (JP); TOSHIBA ENERGY SYSTEMS & SOLUTIONS CORPORATION, Kawasaki (JP)

( * ) Notice: Subject to any disclaimer, the term of this patent is extended or adjusted under 35 U.S.C. 154(b) by 419 days.

(21) Appl. No.: 16/617,365
(22) PCT Filed: May 24, 2018
(86) PCT No.: PCT/JP2018/019991
   § 371 (c)(1),
   (2) Date: Nov. 26, 2019
(87) PCT Pub. No.: WO2018/216767
   PCT Pub. Date: Nov. 29, 2018

(65) Prior Publication Data
   US 2021/0138425 A1   May 13, 2021

(30) Foreign Application Priority Data
   May 26, 2017   (JP) .............................. JP2017-104127

(51) Int. Cl.
   *F03D 7/02*   (2006.01)
   *B01J 19/08*   (2006.01)
   (Continued)

(52) U.S. Cl.
   CPC ................ *B01J 19/08* (2013.01); *C09D 5/24* (2013.01); *C09D 123/16* (2013.01);
   (Continued)

(58) Field of Classification Search
   CPC ................ B01J 19/08; B01J 2219/0875; B01J 2219/0896; C09D 5/24; C09D 123/16; C09D 183/04; C09J 183/08; H05H 1/2406
   See application file for complete search history.

(56) References Cited

U.S. PATENT DOCUMENTS 8,308,112 B2 * 11/2012 Wood ........................ F15D 1/12
                                                         244/203
2004/0055632 A1 * 3/2004 Mazumder ........ H01L 31/02167
                                                         136/291
(Continued)

FOREIGN PATENT DOCUMENTS

JP        2009-56791 A      3/2009
JP        2009056791 A  *   3/2009   ............ B32B 15/04
(Continued)

OTHER PUBLICATIONS

Jan. 29, 2021 Extended Search Report issued in European Patent Application No. 18805212.0.
(Continued)

*Primary Examiner* — Kurtis R Bahr
(74) *Attorney, Agent, or Firm* — Oliff PLC

(57) ABSTRACT

An airflow generation device having a first dielectric substrate made from a rubber elastic material, a first electrode on or near by a first surface of the first dielectric substrate, a second electrode on a second surface, and a second dielectric substrate made from a rubber elastic material covering the second electrode. It makes the airflows generated by plasma caused from partial gas near by the first surface through applied voltage into the first electrode and the second electrode, and bonding portions between the first electrode and the second electrode and the first dielectric
(Continued)

substrate, bonding portions between the second electrode and the second dielectric substrate, and bonding portions between the first dielectric substrate and the second dielectric substrate are bonded by chemical bonds with chemically crosslinking.

13 Claims, 9 Drawing Sheets

(51) Int. Cl.
    *C09D 5/24* (2006.01)
    *C09D 123/16* (2006.01)
    *C09D 183/04* (2006.01)
    *C09J 183/08* (2006.01)
    *H05H 1/24* (2006.01)

(52) U.S. Cl.
    CPC .......... *C09D 183/04* (2013.01); *C09J 183/08* (2013.01); *H05H 1/2406* (2013.01); *B01J 2219/0875* (2013.01); *B01J 2219/0896* (2013.01)

(56) References Cited

U.S. PATENT DOCUMENTS

| | | | | |
|---|---|---|---|---|
| 2004/0195463 | A1* | 10/2004 | Scott | B64C 23/005 244/205 |
| 2011/0283477 | A1* | 11/2011 | Ashpis | H02S 40/10 15/405 |
| 2012/0280501 | A1* | 11/2012 | Tanaka | H05H 1/2406 290/44 |
| 2012/0287550 | A1* | 11/2012 | Tanaka | F03D 7/00 361/225 |
| 2014/0193256 | A1* | 7/2014 | Matsuda | F03D 1/0675 416/3 |
| 2016/0115940 | A1* | 4/2016 | Asayama | F03D 1/0633 290/44 |
| 2016/0146188 | A1* | 5/2016 | Matsuda | F03D 7/022 416/146 R |
| 2016/0215709 | A1* | 7/2016 | Ito | F02M 57/04 |
| 2016/0230783 | A1* | 8/2016 | Onishi | F03D 1/0675 |
| 2016/0271952 | A1* | 9/2016 | Arimizu | B41J 2/1714 |
| 2016/0290321 | A1* | 10/2016 | Tanaka | F03D 7/022 |

FOREIGN PATENT DOCUMENTS

| | | | | |
|---|---|---|---|---|
| JP | 2009-302168 | A | | 12/2009 |
| JP | 2014-30822 | A | | 2/2014 |
| JP | 2014-226621 | A | | 12/2014 |
| JP | 2016-140857 | A | | 8/2016 |
| JP | 2017-045565 | A | | 3/2017 |
| JP | 2017045565 | A | * | 3/2017 ............ Y02E 10/72 |
| JP | 2017-091618 | A | | 5/2017 |

OTHER PUBLICATIONS

Aug. 28, 2018 Search Report issued in International Patent Application No. PCT/JP2018/019991.

* cited by examiner

AIRFLOW GENERATION DEVICE AND MANUFACTURING METHOD FOR SAME

TECHNICAL FIELD

The present invention relates to an airflow generation device which is used for a turning blade of wind-power generation by catching the wind, or a vehicle that moves at high speed and so on, and which generates an airflow by actions of discharge plasma, and a manufacturing method for it.

BACKGROUND OF THE ART

An airflow generation device, which generates an airflow by control of discharge plasma flow and suppresses to quit the flow generated on a blade, is used in order to raise efficiency of rotation of the rotating blade of wind-power generation by the wind as power source or to reduce noise when the blade cuts the wind. Also an airflow generation device is used for a vehicle or a building in order to reduce fricative noise between the air and the vehicle that moves at high speed or noise caused by so-called strong winds blowing through the tall buildings.

According to thus control of the airflow by the discharge plasma, the airflow of thin jet flow referred to as an ion wind is induced on a subjected object such as the blade or the vehicle due to an action of the discharge plasma generated by an applied high voltage between electrodes which confront and sandwich an insulating material. The airflow interacts boundary layer portions of the flow thereof, and it accelerates the flow on the boundary layer portions or gives disturbance. Thereby, quitting thereof is suppressed, and the flow around the subjected object becomes smooth.

The patent document 1 discloses an airflow generation device which comprises a dielectric substrate having a main surface, a first electrode provided on the main surface, a second electrode provided with a gap from the first electrode at a first direction along the main surface in the dielectric substrate, a third electrode provided between the first electrode and second electrode at the first direction and provided at least partially at a deep position in the dielectric substrate from the second electrode, and electric source for applying a voltage for discharge to the first electrode, the second and third electrodes.

For thus dielectric substrates, so far, inorganic insulators such as alumina, glass, mica, and ceramics, and organic insulators such as polyimide, glass epoxy material, and rubber have been conventionally used. Up to now, those dielectric substrates and electrodes are bonded by cure adhesion or adhesion by using an adhesive.

An airflow generation device using materials such as an inorganic insulating material for dielectric substrate, which is hard and has no extensibility, cannot follow expansion and contraction caused by creeping of the blade or changing temperature, or dings caused by hitting hails, hailstones, birds, or insects and causes disconnection or breakage, after the airflow generation device is provided onto the blade of wind turbine generator of the wind-power generation.

An airflow generation device using resins such as the polyimide or the glass epoxy material as the dielectric substrate cannot be used with a subjected object for long period out of doors, because those resins are inferior in electric resistance or weather resistance and gradually deteriorate and decompose by repeated discharge plasma or by weather or climate change.

An airflow generation device using general synthetic rubber as dielectric substrates has comparatively well following-property onto a flexible subjected object such as a blade and so on. However, when metal electrodes and dielectric substrates are vulcanized and adhered, the synthetic rubber is slightly shrunk and thereby curved and undulated to a direction of thickness due to difference between both of heat expansion coefficients thereof. The synthetic rubber is bond to the electrodes so as to have unhomogeneous concave-convex surface. Therefore the electrodes do not become flat and accuracy of distance between electrodes or thickness of the dielectric substrate becomes diminished. Accordingly, plasma discharge is preferentially generated at a short portion of a distance between the electrodes or a thin portion of thickness of the dielectric substrates and the plasma vitiates homogeneousness thereof to longer direction. Thereby, an airflow generated by the plasma vitiates homogeneousness thereof. Therefore it vitiates a control effect of a flow around the blade by the airflow so that use efficiency of the wind becomes diminished or noise becomes bigger due to uneven plasma flow.

On the other hand, if electrodes and dielectric substrates are bonded with an adhesive, the adhesive is chemically deteriorated to be peeled off easily because it is exposed with weather and baking heat on a blade of a wind turbine generator getting continuously centrifugal force or on a vehicle or a construction. Therefore reliability or safety for control of discharge plasma flow on the electrodes cannot be acquired.

PRIOR ART DOCUMENT

Patent Document

[Patent Document 1] Japanese Patent Application Publication No. 2016-140857

SUMMARY OF THE INVENTION

Problems to be Solved by the Invention

The present invention was made in view of solving the above described problems, and its object is to provide an airflow generation device in which dielectric substrates and electrodes are strongly bonded by chemical bonds with chemically crosslinking, which efficiently and homogeneously generates an airflow by plasma discharge between electrodes sandwiching a dielectric substrate, has excellent bendability, heat resistance, weather resistance or light resistance, does not peel off under pitiless conditions of weather, sun light or temperature change out of doors, is not disconnected, and is not destroyed. Other object is to provide a manufacturing method for it.

Means for Solving Problems

An airflow generation device of the present invention developed to achieve the objects described above comprises: a dielectric substrate that is made from a rubber elastic material, and plural electrodes that are provided on the dielectric substrate.

And the airflow generation device makes airflows generated by plasma caused from partial gas near by the dielectric substrate through an applied voltage into the electrodes, and bonding portions between the electrodes and the dielectric substrate are bonded by chemical bonds with chemically crosslinking through unsaturated groups or vinylsilyl-containing-silyl groups.

The airflow generation device has a first dielectric substrate made from a rubber elastic material, a first electrode provided on or near by a first surface of the first dielectric substrate, a second electrode provided on a second surface as a different side surface from the first surface, and a second dielectric substrate made from a rubber elastic material so as to cover the second electrode, and makes the airflows generated by plasma caused from partial gas near by the first surface of the first dielectric substrate through an applied voltage into the first electrode and the second electrode.

And bonding portions between the first electrode and the second electrode and the first dielectric substrate, and bonding portions between the second electrode and the second dielectric substrate are bonded by chemical bonds with chemically crosslinking through the unsaturated groups or vinylsilyl-containing-silyl groups, and bonding portions between the first dielectric substrate and the second dielectric substrate are bonded by chemical bonds with chemically crosslinking through unsaturated groups or vinylsilyl-containing-silyl groups which bond to surface of those substrates and/or exist on the surface thereof.

In the airflow generation device, it is preferable that the first dielectric substrate and the second dielectric substrate are respectively the rubber elastic material in which a composition including rubber ingredient is three-dimensionally network-crosslinked, and which are formed into an elastic sheet-like shape and are made from three-dimensionally crosslinked silicone rubber or three-dimensionally crosslinked ethylene-propylene-diene rubber.

In the airflow generation device, bonding portions between the second electrode and the first dielectric substrate and bonding portions between the second electrode and the second dielectric substrate may be bonded by chemical bonds with chemically crosslinking, due to the rubber elastic material having unsaturated groups or vinylsilyl-containing-silyl groups.

In the airflow generation device, it is preferable that the chemical bonds are covalent bonds through unsaturated groups or vinylsilyl-containing-silyl groups.

In the airflow generation device, it is furthermore preferable that the unsaturated groups or vinylsilyl-containing-silyl groups exist in a molecule of the rubber elastic material and/or on the surface thereof respectively.

In the airflow generation device, the first electrode or the second electrode and the first dielectric substrate, and first dielectric substrate and the second dielectric substrate may be bonded by the chemical bonds with chemically crosslinking, on which the unsaturated groups or vinylsilyl-containing-silyl groups on the surfaces thereof hold a platinum catalyst or a rhodium catalyst.

In the airflow generation device, for example, at bonding portions between the first electrode and the second electrodes and the first dielectric substrate, the unsaturated groups or vinylsilyl-containing-silyl groups make covalent bonds to dehydrogenated residues of hydroxyl groups on at least any one of surface of the first electrode and second electrode and the first dielectric substrate, and at bonding portions between the first dielectric substrate and the second dielectric substrate, dehydrogenated residues of hydroxyl groups on the surface of the first dielectric substrate, or unsaturated groups or vinylsilyl-containing-silyl groups bonded on the surface thereof and/or existing on the surface thereof make covalent bonds.

In the airflow generation device, at least any one of surfaces of the first electrode, the second electrode and the first dielectric substrate may be a corona treated surface, a plasma treated surface, an ultraviolet treated surface and/or an excimer treated surface.

In the airflow generation device, it is preferable that at least a part of the first electrode is protected with a coating layer or a film layer.

In the airflow generation device, it is preferable that the coating layer or the film layer is a layer made from a conductive rubber material.

In the airflow generation device, the second electrode comprises a metal layer or a metal plate, and a conductive rubber layer or a conductive resin layer which contacts with the metal layer or the metal plate and expands to a side of the first electrode beyond them.

In the airflow generation device, the second electrode comprises a conductive rubber layer or a conductive resin layer which extends to a side of the first electrode.

In the airflow generation device, for example, the airflow generation device is put at a side of a second surface of the second dielectric substrate onto a subjected object which moves in the air relatively.

A manufacturing method for an airflow generation device of the present invention developed to achieve the objects described above is follows.

In the manufacturing method for an airflow generation device having a dielectric substrate that is made from a rubber elastic material, and plural electrodes that are provided on the dielectric substrate, which makes airflows generated by plasma caused from partial gas near by the dielectric substrate through an applied voltage into the electrodes, and in which bonding portions between the electrodes and the dielectric substrate are bonded by chemical bonds with chemically crosslinking through unsaturated groups or vinylsilyl-containing-silyl groups, the method comprising; a step for bonding the electrodes and the dielectric substrates at bonding portions thereof by chemical bonds through the unsaturated groups or vinylsilyl-containing-groups.

In the manufacturing method for the airflow generation device, wherein the airflow generation device has a first dielectric substrate made from the rubber elastic material, a first electrode provided on or near by a first surface of the first dielectric substrate, a second electrode provided on a second surface as a different side surface from the first surface, and a second dielectric substrate made from the rubber elastic material so as to cover the second electrode, which makes the airflows generated by plasma caused from partial gas near by the first surface of the first dielectric substrate through applied voltage into the first electrode and the second electrode.

The method comprising;

a step for reacting the unsaturated groups or vinylsilyl-containing-silyl groups to the first electrode and the second electrode at a side of a bonding surface with the first dielectric substrate, a step for applying the first electrode and the second electrode onto the first dielectric substrate at the side of the bonding surface, and for bonding by chemical bonds through the unsaturated groups or vinylsilyl-containing-silyl groups at bonding portions of the first electrode, the second electrode and the first dielectric substrate, and a step for curing the rubber elastic material over the second electrode with the first dielectric substrate together on the second surface, and thereby bonding the second electrode and the second dielectric substrate, and the first dielectric substrate and the second dielectric substrate at binding portions thereof by chemical bonds through unsaturated groups or vinylsilyl-containing-silyl groups.

Effects of the Invention

In the airflow generation device of the present invention, the first electrode and second electrode are strongly and homogeneously bonded onto each of different surfaces of the first dielectric substrate comprising an insulating rubber-elastic dielectric substrate by homogeneous covalent bonds through the unsaturated groups or vinylsilyl-containing-silyl groups.

In the airflow generation device, the first electrode and the second electrode and the first dielectric substrate which is preliminarily cured by polymerization or vulcanization are bonded through the covalent bonds by a molecular adhesive as a compound having the vinylsilyl-containing-silyl groups. Therefore it is not necessary to consider that different heat-expansion or steric contraction based on difference of materials of the first dielectric substrate and the first electrode and the second electrode. The precision dimensional accuracy can be accompanied, even if it has short length of 1 mm to 100 mm or long length of 10 cm to 100 m.

And in the airflow generation device, the second electrode and the first dielectric substrate or the second dielectric substrate are strongly bonded, because they are chemically crosslinked with molecular bonding by homogeneous chemical bond through the unsaturated groups or the vinylsilyl-containing-silyl groups.

While a sheet-shaped first dielectric substrate is used for the airflow generation device, the molecular bonding technologies of surface treatment are used for bonding the first electrode and the second electrode with the first dielectric substrate or the second dielectric substrate, and bonding the first dielectric substrate and the second dielectric substrate in the airflow generation device. Only if the technologies are used, it is not necessary to carry out the technologies under high pressure or high temperature. They are kept with even thickness, and are able to be bonded without undulation caused by difference of coefficients of linear contraction. Therefore extremely strict precision of the thickness is improved.

Therethrough, the plasma discharge can be evenly and uniformly generated between the electrodes sandwiching the dielectric substrate, and the airflow is able to be effectively and equally generated. Consequently, the control effect of the flow around the subjected object attached to the airflow generation device may be maximized. Thereby, for example, quitting from the blade of the wind-power generation is able to be suppressed to increase the use efficiency of the wind, or to reduce the frictional noise caused by cutting the air while rotating the blade. And thereby, a flow of a breeze received on a moving transportation such as a train, a vehicle or an elevator makes smooth or a flow of a breeze received on a fin or a fan of a home electric appliance or a depressurization/pressurization air pump or a depressurization compressor makes smooth. Consequently the noise can be kept down.

In the airflow generation device, the electrodes and the first dielectric substrate, the first dielectric substrate and the second dielectric substrate are bonded by the homogeneous covalent bonds through the unsaturated groups or the vinylsilyl-containing-silyl groups more strongly than binding by an intermolecular force of an adhesive.

Because the electrodes and the first dielectric substrate in the airflow generation device are chemically and strongly crosslinked and bonded by the chemical bonds through the unsaturated groups or the vinylsilyl-containing-silyl groups, the airflow generation device has excellent heat resistance, weather resistance, light resistance or water resistance and has high mechanical strength. And the airflow generation device does not peel off under pitiless conditions of weather, sun light or temperature change etc. out of doors, is able to follow dings caused by hitting hails, hailstones, birds, or insects, and does not cause disconnection or breakage.

Since the second dielectric substrate in the airflow generation device is a hardened material made from a composition containing rubber ingredients such as liquid-type, elastic-type, or millable-type rubber composition, voids do not accrue between the electrodes when curing. Therefore, the efficiency of plasma discharge is extremely high.

The airflow generation device satisfies a function for the electrodes of control of the airflow. The electrodes are chemically crosslinked and bonded by the homogeneous chemical bonds through the unsaturated groups or the vinylsilyl-containing-silyl groups onto the first dielectric substrate and the second dielectric substrate, and the voids between the first dielectric substrate and the second dielectric substrate are not accrued. In cooperation with them, the airflow generation device is able to be formed as an uniform sheet-like shape, and is not peeled off even if it is individually rolled up as a roll-like shape. Therefore it is used for the electrodes of control of the airflow which is easy to be stored or to be transported before it is applied onto the subjected object to be constructed.

When the first electrode is protected with the coating layer or the film layer, the airflow generation device can prevent to accrue the dings caused by hitting hails, hailstones, birds, or insects, and still more prevent to cause disconnection. When the coating layer or the film layer is a layer made from the conductive rubber material, the disconnection is compensated by the conductive rubber material in a worst case of occurrence thereof on the electrodes.

When the second electrode comprises a metal layer or a metal plate, and a conductive rubber layer or a conductive resin layer which contacts to the layer or plate and extends to neighbourhood of the first electrode than the second electrode, or comprises a conductive rubber layer which extends to neighbourhood of the first electrode in the airflow generation device, the electrodes improves their flexibility. Therefore, when the airflow generation device is used to be curved or bended, the electrodes do not peel off and can follow curving or bending thereof. Consequently, the scope of usage of the airflow generation device will widen according to purposes of flexibility.

According to manufacturing method for the airflow generation device, the electrodes and the first dielectric substrate or the second dielectric substrate, and the first dielectric substrate and the second dielectric substrate can be chemically crosslinked and easily bonded by the chemical bonds through the unsaturated groups or the vinylsilyl-containing-silyl groups at 0 to 250 deg C. generally, preferably at temperature from a room temperature to a relatively lower heating temperature of ca. 50-200 deg C. without using a high pressure or a pressing force in shout time. Therefore the productive efficiency is excellent. Furthermore, according to the manufacturing method for it, the airflow generation device having any size which is from several mm of breadth and length to breadth of 1 mm to 10 cm and length of ca. 100 m at maximum can be homogeneously manufactured. Consequently, the airflow generation device can be used for wide range of the subjected object such as not only fins or fans of home electric appliances or small products of a depressurization/pressurization air pump or a depressurization compressor but also huge products such as a blade of wind-power generation, vehicles, train cars, elevators, rockets or constructions.

MODE FOR CARRYING OUT THE INVENTION

Hereunder, embodiments to practice the present invention in detail will be explained, but the scope of the present invention is not restricted by these embodiments.

Figure 1:
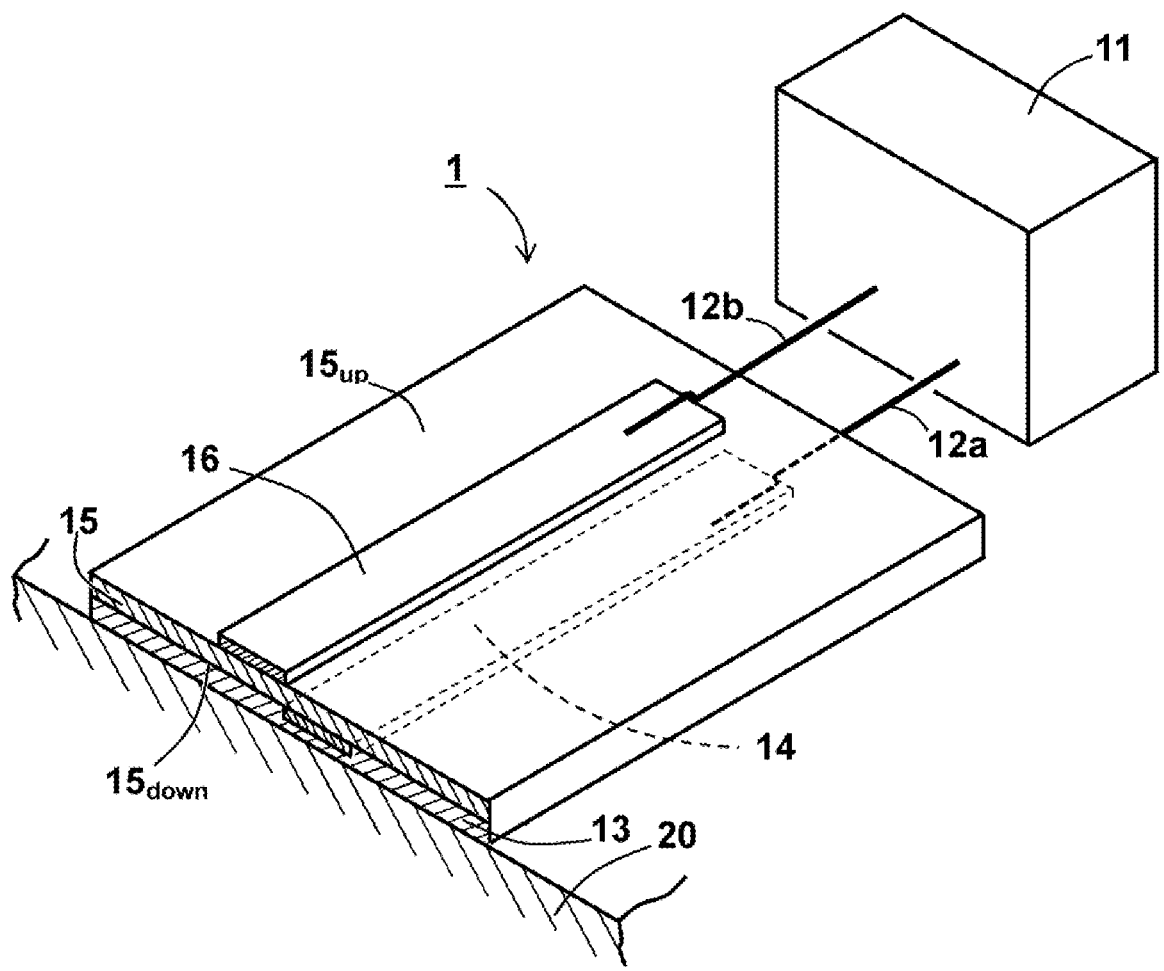
FIG. 1 is a schematic perspective view of the airflow generation device of the present invention which is partially cut out.

An airflow generation device 1 of the present invention as one embodiment having a long shape is explained with referring FIG. 1 that is a schematic perspective view of the airflow generation device of the present invention which is partially cut out. The airflow generation device 1 comprises a first dielectric substrate 15 and a second dielectric substrate 13. As regards the first dielectric substrate 15, a first electrode 16 having even thickness and a second electrode 14 having even thickness which are conductive material layers or conductive material plates made from for example a metal, a conductive resin, or resin including metal meshes, are respectively attached to the first dielectric substrate 15 at a first surface $15_{up}$ as a top side and a second surface $15_{down}$ as a back side, and the first dielectric substrate 15 is a first insulating dielectric substrate having even thickness. The second dielectric substrate 13 covers the second electrode 14 along with the first dielectric substrate 15 at the second surface $15_{down}$ and is a rubber elastic covering substrate having insulation property.

The first electrode 16 is attached through chemical bonds onto a part of the first surface $15_{up}$ of the first dielectric substrate 15. And the second electrode 14 is attached through chemical bonds onto a part of the second surface $15_{down}$ thereof. The first dielectric substrate 15 is a rubber sheet which is preliminarily formed.

The first electrode 16 and the second electrode 14 are arranged so that an inner edge face (i.e. a right edge face in the figure) of the first electrode 16 which is along a longer direction (i.e. a front-back direction of a plane of the paper) is located at a just above direction (i.e. an upper direction of a thickness direction in the figure) of an inner edge face (i.e. a left edge face in the figure) of the second electrode 14 which is along a longer direction (i.e. above-mentioned one). Both elongated aspects of respective surfaces of the first electrodes 16 and the second electrodes 14 with the dielectric substrate 15 are parallel. Thereby, the first electrode 16 and the second electrode 14 are paralleled at different height.

In the airflow generation device 1, the first electrode 16 and the second electrode 14 respectively have even thickness $T_1$ and $T_3$ and are conductive material layers having the thickness of 1 micron or more to less than 1000 micron or a conductive material plates having thickness of 1-10 mm preferably 0.1-5 mm for example 1 mm.

Figure 2:
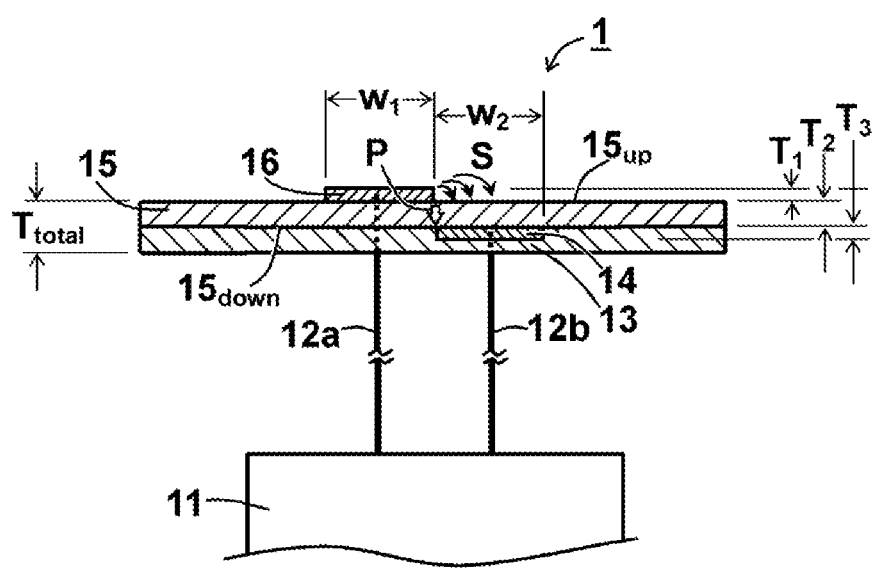
FIG. 2 is a schematic cross-sectional view of the airflow generation device of the present invention.

FIG. 2 is a schematic cross-sectional view which shows a perpendicular cross-section against a longer direction of the airflow generation device 1. As shown in FIG. 2, as regards the first electrode 16 and the second electrode 14, the even breadth $W_1$ and $W_2$ thereof are from 1 mm to 10 cm for example 3-6 mm, and the length L along the longer direction (see FIG. 10) thereof are respectively from 10 mm to 100 m, for example from 10 cm to 30 m, preferably 1-10 m. In both of the electrodes 14, 16, although each of the breadth $W_1$ and $W_2$ and each of the thickness $T_1$ and $T_2$ may be same or different each other, it is preferable that the length L are substantively same. When the length are different each other, the airflow is unevenly generated along the longer direction because the plasma discharge is unhomogeneous at a middle portion and an end portion.

The thickness $T_2$ of the first dielectric substrate 15 is even. The thickness $T_2$ is for example 0.05-10 mm, preferably 0.1-2.0 mm, more preferably 0.5-1.5 mm. When the voltage potential difference becomes over a threshold after a voltage is applied between the first electrode 16 and the second electrode 14, the discharge is generated near by the first surface $15_{up}$ of the first dielectric substrate 15 as the insulant which does not directly discharge, and then the charge plasma is generated by the discharge. Thus discharge is referred to as dielectric-barrier discharge, and is a creeping discharge which is made along the first surface $15_{up}$ of the first dielectric substrate 15. The thickness $T_2$ of the first dielectric substrate 15 is regulated so that a flow S is generated on the first surface $15_{up}$ by the discharge The second electrode 14 is bonded through the chemical bonds onto a part of the second surface $15_{down}$ of the first dielectric substrate 15. The second dielectric substrate 13 covers the second electrode 14 along with the first dielectric substrate 15 at the second surface $15_{down}$ of the first dielectric substrate 15. The second dielectric substrate 13 is a hardened material in which a composition including rubber ingredients are subsequently cured so as to cover the second dielectric substrate 13 along with the first dielectric substrate 15.

Because the second dielectric substrate 13 is a hardened material in which the composition including the rubber ingredients are subsequently cured on the second surface $15_{down}$ of the first dielectric substrate 15 so as to cover the second electrode 14, there are no voids between angles or edges of the second electrode 14 and the first dielectric substrate 15 as the hardened material when curing.

Total thickness $T_{total}$ of the second dielectric substrate 13 and the first dielectric substrate 15, or total thickness $T_{total}$ of the second electrode 14, the second dielectric substrate 13 and the first dielectric substrate 15 when existing of the second electrode 14 in the thickness direction, is for example 0.0-30 mm, preferably 1-3 mm, more specifically 2 mm.

A connection wire 12a, which is bonded by metal joining from neighbourhood of one end portion of the first electrode 16, is extended. A connection wire 12b, which is bonded by metal joining from neighbourhood of the second electrode 14, is extended. The connection wires 12a, 12b are connected to a power source unit 11 which integrates a power circuit and a power control circuit.

For example, the airflow generation device 1 is used to be applied at the second surface of the second dielectric substrate onto the subjected object which moves in the air relatively. As the subjected objects which spontaneously move in the air, examples of them are blades of wind-power generation which receive the wind and rotate; vehicles such as automobile for example a passenger car, a motor truck, and a racing car which move at high speed; rail vehicles such as a train, a bullet train, a magnetic levitation train; aircrafts or aeronautical transports such as a jet plane, a propeller plane, a helicopter, and a drone; a rocket; a fin or a fan for a pressure adjuster or an airflow controller such as a depressurization pump, a vacuum pump, and a pneumatic compressor; elevating equipment such as an elevator. On the other hand, as the subjected objects which do not move themselves and on which receive the flowing air, examples of them are constructions such as a bridge, a steel tower, and a building.

In the airflow generation device 1, materials of the first electrode 16 and the second electrode 14 are not restricted as specific varieties, in so far as the conductive substances. Examples of them are electrodes made from metal, a resin including conductive substance or a conductive resin such as a conductive rubber, a conductive elastomer.

Metals for materials of the first electrode 16 and the second electrode 14, are exemplified with a normal metal, a functional metal, an amorphous metal, a fiber reinforced metal block, a shape memory alloy, a super-elastic alloy and so on, according to metal classification. Examples of their materials are any one of beryllium, magnesium, calcium, strontium, barium, radium, scandium, yttrium, titanium, zirconium, vanadium, niobium, tantalum, chromium, molybdenum, tungsten, manganese, iron, cobalt, rhodium, iridium, nickel, palladium, platinum, copper, silver, gold, zinc, cadmium, mercury, aluminium, germanium, tin, lead, antimony, bismuth, neodymium according to a periodic table; or an iron alloy (steel, carbon steel, cast iron), a copper alloy (phosphor bronze, brass, cupronickel, beryllium copper, titanium copper), an aluminum alloy (alloy of copper, manganese, silicon, magnesium, zinc, or nickel etc.), a magnesium alloy (Mg/Zn alloy, Mg/Ca alloy etc.), a zinc alloy, tin and tin alloy, a nickel alloy, a gold alloy, a silver alloy, a platinum alloy, a palladium alloy, a lead alloy, a titanium alloy (alpha type, beta type, and alpha beta type alloy), a cadmium alloy, a zirconium alloy, a cobalt alloy, a chromium alloy, a molybdenum alloy, a tungsten alloy, a manganese alloy, a ferritic stainless steel, a martensitic stainless steel, an austenitic stainless steel, a precipitation strengthened stainless steel, a nickel-titanium alloy, an iron-manganese-titanium alloy, a super-elastic alloy (nickel-titanium alloy) and so on according to alloy compositions. As the materials, conductive substance layers such as metal foils or metal plates are exemplified. However, the materials include a plate, s sheet, a film, a square bar, a cylindrical bar, a ball, a sphere, a hemisphere, a fiber, a net, a mesh and circuit shapes complex of them, and a punching or cutting molded piece.

The second electrode may be a combination consisting of a metal layer or a metal plate and a conductive rubber layer or a conductive resin layer which is contacted thereto and expands to a side of the first electrode beyond them, or may be a conductive rubber layer or a conductive resin layer which expands to a side of the first electrode.

As materials for the first electrode 16 and the second electrode 14, examples of them are a conductive flexible rubber or a conductive hard resin, except for metal. Concrete examples of them are a natural resin or a synthetic resin which may be a resin or a rubber including or dispersing conductive substances. More specific examples of them are a synthetic resin including and/or dispersing conductive inorganic powder or conductive fibers, a synthetic resin including and/or dispersing conductive organic substances, and conductive polymers (electric conductive polymer compounds).

As the filler of the conductive inorganic powder or the conductive fibers in the synthetic resin including the conductive inorganic powder or the conductive fibers, examples of them are silicon; carbon, carbon black, graphite, a carbon fiber; metal powder or metal fiber such as the metals of above-mentioned examples of materials for the first electrode 16 and the second electrode 14, preferably gold, silver, copper, titanium, nickel, tin, aluminium, stainless steel, zinc, bismuth, cadmium, indium, lead, or palladium; alloy powder or alloy fibers such as alloys of any two or more of those metals, for example, Sn—Pb, Sn—Cu, Sn—Zn, Sn—Al, Sn—Ag, Pd—Ag; a conductive whisker; a metal mesh from those metals.

In the synthetic resin including the conductive organic materials, examples of the conductive organic materials are ion-conducting agents such as organic compounds having quaternary ammonium groups and/or sulfonic groups. After the resin raw materials of main agents, the curative agents, the ion-conducting agents are mixed in the solvent and then cured, the synthetic resin including the ion-conducting agents is obtained.

As the synthetic resins in the synthetic resins including the conductive inorganic powder or the conductive fibers or in the synthetic resins or the natural resins including the conductive organic substance, examples of the synthetic resins are an epoxy based resin; a polyolefin based resin such as polyethylene, polypropylene; ethylene-ethyl acrylate copolymers; polyvinyl chloride; an ethylene-vinyl acetate copolymer resin; a fluorocarbon resin; an acrylic resin; a polyester resin such as polyethylene terephthalate, polybutylene terephthalate; an urethane resin; a phenol resin: a cyanate resin; an acrylonitrile-butadiene-styrene rubber and an acrylonitrile-butadiene-styrene resin; polycarbonate; polyamide; silicone such as silicone rubber and silicone resin; natural rubber; a synthetic rubber such as isoprene rubber, butadiene rubber, chloroprene rubber, ethylene-propylene-diene rubber, butyl rubber, nitrile rubber, ethylene-propylene rubber, chlorosulfonated polyethylene rubber, urethane rubber, fluororubber, epichlorohydrin rubber, polysulfide rubber. As the natural resin thereof, example of them is natural rubber.

The conductive polymer is, for example, a resin formed from the organic compounds having a conductive property. Examples of them are polyacetylene; polypyrrole; polythiophene; polyparaphenylene; poly meta-phenylenediamine; poly(p-phenylene vinylene); polyaniline; poly(p-phenylene sulfide); anionic polymer or latex.

When the materials of the first electrode 16 and the second electrode 14 are metal, a value of resistance thereof is extremely low. On the other hand, when the materials thereof are the resin including conductive substances or are the conductive resin, they have conductive property of which a volume resistivity is $1\times10^0$ ohm cm or less, preferably $1\times10^{-3}$ ohm cm or less.

Among them, it is preferable that the first electrode is the conductive metal.

As the materials of the first dielectric substrate 15 in the airflow generation device 1, they are not restricted, as long as they are rubber.

Examples of them are, for example, additive crosslinking silicone rubber.

Concrete examples of them are composition of vinyl group containing polysiloxane synthesized under presence of Pt catalyst such as vinylmethylsiloxane/polydimethylsiloxane copolymer, vinyl-terminated polydimethylsiloxane, vinyl-terminated diphenylsiloxane/polydimethylsiloxane copolymer, vinyl-terminated diethylsiloxane/polydimethylsiloxane copolymer, vinyl-terminated trifluoropropylmethylsiloxane/polydimethylsiloxane copolymer, vinyl-terminated polyphenylmethylsiloxane, vinylmethylsiloxane/dimethyl siloxane copolymer, trimethylsiloxane group-terminated dimethylsiloxane/vinylmethylsiloxane/diphenylsiloxane copolymer, trimethylsiloxane group-terminated dimethylsiloxane/vinylmethylsiloxane/ditrifluoropropylmethylsiloxane copolymer, trimethylsiloxane group-terminated polyvinylmethylsiloxane, with H group containing polysiloxane exemplified by H-terminated polysiloxane, methyl H siloxane/dimethylsiloxane copolymer, polymethyl H siloxane, polyethyl H siloxane, H-terminated polyphenyl(dimethyl H siloxy)siloxane, methyl H siloxane/phenylmethylsiloxane copolymer, methyl H siloxane/octylmethylsiloxane copolymer; rubber obtained from the composition of amino group containing polysiloxane exemplified by aminopropyl-terminated polydimethylsiloxane, aminopropyl methyl siloxane/dimethyl siloxane copolymer, aminoethyl aminoisobutyl methyl siloxane/dimethyl siloxane copolymer, aminoethyl aminopropyl methoxysiloxane/dimethyl siloxane copolymer, dimethyl amino-terminated polydimethylsiloxane, with epoxy group containing polysiloxane exemplified by epoxypropyl-terminated polydimethyl siloxane, (epoxycyclohexylethyl)methyl siloxane/dimethylsiloxane copolymer, or acid anhydride group containing polysiloxane exemplified by succinic anhydride-terminated polydimethylsiloxane and isocyanate group containing compound such as tolyldiisocyanate, 1,6-hexamethylenediisocyanate;

silicone rubber such as vinylmethylsilicone (VMQ), methylphenylsilicone (PVMQ), fluoromethylsilicone (FVMQ), and dimethylsilicone (MQ);

peroxide cross-linked silicone rubber; condensation cross-linked silicone rubber;

ultraviolet cross-linked silicone rubber: radiation cross-linked silicone rubber; three-dimensional silicone having a steric crosslinking structure, which is prepared by adding co-blend of those silicone and olefin into a mold and then crosslinking;

fluororubber such as ethylene-propylene-diene rubber (EPDM), vinylidene fluoride series (FKM), tetrafluoroethylene-propylene series (FEPM), tetrafluoroethylene-perfluorovinylether series (FFKM), or butadiene rubber (BR), isoprene rubber (IR), isobutylene-isoprene rubber (IIR), natural rubber (NR), urethane rubber (U), acrylic rubber (ACM), co-blend of these crosslinking rubbers and olefins; amorphous resin, for example, polyvinyl chloride (PVC); polystyrene (PS);

acrylonitrile-butadiene-styrene copolymer (ABS); polyamide (PA);
polymethyl methacrylate (PMMA);
polycarbonate (PC);
polybutadiene terephthalate (PBT) or polyethylene terephthalate (PET);
polyphenylene sulfide (PPS);

(meta)acrylic resin such as polyester (meta)acrylate, epoxy (meta)acrylate, urethane (meta)acrylate, polyether (meta)acrylate, and silicone (meta)acrylate, and pentaerythritol tetra(meta)acrylate.

Among them, it is preferable that the first dielectric substrate 15 is an elastic covered substrate made from a three-dimensional crosslinking silicone rubber or an elastic covered substrate made from three-dimensional crosslinking ethylene-propylene-diene rubber which is made as a sheet-like shape having elasticity by three-dimensionally network-crosslinking.

Concretely, the raw material composition for forming the first dielectric substrate 15 may be a millable type or liquid type composition. It is preferable that the silicone resin rubber or the ethylene-propylene-diene rubber for forming the first dielectric substrate 15 includes the unsaturated groups such as polymerizable vinyl groups. When it includes the vinyl groups therein, the vinyl groups are exposed on the surface of the dielectric substrate 15, and then are easy to be bonded to the unsaturated groups of the vinyl groups or hydrosilyl groups in the hardened material in the second dielectric substrate 13 or the unsaturated groups of the vinyl groups or hydrosilyl groups in rubber-forming ingredients in the raw material composition.

When the unsaturated groups such as the vinyl groups on the surface are exposed on the first dielectric substrate 15, the materials of the first dielectric substrate 15 may hold a platinum (Pt) catalyst or a rhodium (Rh) catalyst in order to chemically crosslink and bond the second dielectric substrate 13 through the chemical bonds easily.

When the first dielectric substrate 15 is made from the silicone rubber, strength of dielectric breakdown thereof is for example 25 kV/mm or more, preferably 30 kV/mm or more according to a method for measurement implemented relation to Japanese Industrial Standard C2110-1, and a value of tracking resistance is 35 kV or more, preferably 45 kV or more.

As regards the first dielectric substrate 15, the second electrode 14 is applied onto a part of the second surface 15$_{down}$, and the first electrode 16 is applied onto a part of the first surface 15$_{up}$. Both of them are chemically crosslinked and bonded thereto through the chemical bonds respectively. The bonding portion of the first electrode 16 and the second electrode 14 with the first dielectric substrate 15, and the bonding portion of the second electrode 14 and the second dielectric substrate 13 are chemically crosslinked and bonded by the chemical bonds through the unsaturated groups or the vinylsilyl-containing-silyl groups. The bonding portion of the first dielectric substrate 15 and the second dielectric substrate 13 is chemically crosslinked and bonded by the chemical bonds through the unsaturated groups or the vinylsilyl-containing-silyl groups which are bonded on the surfaces of the substrates and/or exist on the surfaces.

The first dielectric substrate 15 is bonded with the first electrode 16 and the second electrode 14. For example, surfaces of at least one of them have an amplified portion where is amplified by siloxy groups having the unsaturated groups or the vinylsilyl-containing-silyl groups which are bonded to an modified portion where is surface-modified by an alkoxysiloxane having the unsaturated groups or the vinylsilyl-containing-silyl groups which are bonded to at least one of surface-exposed reactive groups such as hydroxyl groups. One substrate is bonded to the surface of the other substrate or the electrodes through the amplified portion.

For example, the surface of the bonding side on the first electrode 16 and the second electrode 14 is treated with a surface-activating treatment such as a corona discharge treatment, a plasma treatment, an ultraviolet treatment or an excimer treatment before forming the amplified portion and/or after forming the amplified portion. And the surface of the bonding side on the first dielectric substrate 15 is treated with a surface-activating treatment such as a corona discharge treatment, a plasma treatment, an ultraviolet treatment or an excimer treatment before forming the amplified portion and/or after forming the amplified portion, if necessary. Thereby, the surface-exposed reactive groups such as hydroxyl groups, carboxyl groups and/or carbonyl groups are further newly produced on those surfaces.

It is preferable that the surface-exposed reactive groups such as the hydroxyl groups, the carboxyl groups or the carbonyl groups are produced with enough concentration thereof on the surfaces of the bonding side between the first dielectric substrate 15 with the first electrode 16 and the second electrode 14. Or it is preferable that the concentration of the active groups for reacting to the surface-exposed activated groups on the other ones is amplified by using the surface-exposed activated groups such as the hydroxyl groups etc. which are produced slightly thereby. Specifically, it is more preferably that the surface-exposed reactive groups are newly introduced onto both of the first dielectric substrate 15 and the first electrode 16 and the second electrode 14.

For producing the surface-exposed having enough concentration thereof onto the surfaces of the bonding sides between the first dielectric substrate 15 and the first electrode 16 and the second electrode 14, for example, at least one of the first dielectric substrate 15 and the first electrode 16 and the second electrode 14 bonded each other are treated with a surface-activating treatment such as a corona discharge treatment, a plasma treatment, an ultraviolet treatment or an excimer treatment. And then, the surface-exposed reactive groups having high reactivity such as the hydroxyl groups, the carboxyl groups, or the carbonyl groups are produced onto the surfaces of the bonding sides on organic or inorganic materials. The hydroxyl groups, the carboxyl groups and the carbonyl groups all which are newly produced and the original hydroxyl groups are provided as the scattered surface-exposed reactive groups on the bonding surfaces.

For example, the alkoxysiloxane having vinylsilyl groups is treated by immersing, applying or spraying it thereon. The alkoxysiloxane is bonded to the surface-exposed reactive groups such as the hydroxyl groups, the carboxyl groups or the carbonyl groups through covalent bonds such as ether bonds or ester bonds. Therefore the surface-exposed reactive groups having low reactivity are improved on the surfaces by the alkoxysiloxane having vinyl the silyl groups. Consequently vinylsilyl groups from the alkoxysiloxane having the vinylsilyl groups are exposed to improve the surfaces.

And then, alkoxysilyl groups of other alkoxysiloxane having vinyl groups are reacted to the alkoxysilyl group on the improved portion to be bonded though new siloxy bonds by an alcohol reaction. Consequently one group of the surface-exposed reactive group having the inherently-low reactivity is more improved by plural vinyl groups having high reactivity from the alkoxysiloxane having the plural vinylsilyl groups. Therefore, for example, mono-molecular layer is formed. It is preferable that both surfaces of the bonding sides of the first dielectric substrate 15 and the first electrode 16 and the second electrode 14 are surface-modified by other alkoxysiloxane having silyl groups which includes unsaturated groups or vinylsilyl groups alike to be amplified by the alkoxysiloxane having plural vinyl groups.

And the amplified portion in which the vinyl groups are exposed from one or both of the first dielectric substrate 15 and the first electrode 16 and the second electrode 14, is formed. If necessary, the surface, on which the amplified portion is exposed, is treated with a corona discharge treatment, a plasma treatment, an ultraviolet treatment and/or an excimer treatment to become amplified portions on which exposed silanol groups or silyl groups are produced by oxidative cleavage of at least a part or all of the vinyl groups.

When the first dielectric substrate 15 and the first electrode 16 and the second electrode 14 are simply contacted to be piled or are piled under a pressurized or reduced pressure, one side of the bonding surfaces is bonded to the other side of the bonding surfaces by covalent bonds through the unsaturated groups or vinylsilyl-containing-silyl groups. In this case, the vinyl groups in each other, the silanol groups in each other, the silyl group in each other or combination thereof, which exist on the amplified portion of the first dielectric substrate 15 and the first electrode 16 and the second electrode 14 are reacted each other.

Thus, the surface-exposed reactive groups of the first dielectric substrate 15 and the first electrode 16 and the second electrode 14 are reacted with one molecule of the molecular adhesive of the alkoxysiloxane having the unsaturated groups or the vinylsilyl-containing-silyl groups to become so-called mono-molecular layer. If necessary, one molecule of other molecular adhesive of the alkoxysiloxane having the vinyl groups is reacted to form further mono-molecular layer. Thereby, they attribute bonding of both of the substrates. The first dielectric substrate 15 and the first electrode 16 and the second electrode 14 are chemically bonded with the mono-molecular layer of the alkoxysiloxane having the unsaturated groups or the vinylsilyl-containing-silyl groups by the covalent bonds though other mono-molecular layer of other alkoxysiloxane having the vinyl groups of other molecular adhesive or by an addition reaction of respective vinyl groups in each other and/or a condensation reaction of the alkoxysiloxy groups in each other.

The alkoxysiloxane having the unsaturated groups or the vinylsilyl-containing-silyl groups is not restricted, as long as it has the unsaturated groups or the vinylsilyl-containing-silyl groups which has at least one selected from a vinylsilyl-containing-silyl group and an unsaturated group-containing-silyl group all which is able to be bonded with the surface-exposed reactive groups. It may be a silane coupling agent. For example, examples of the alkoxysiloxane having the unsaturated groups or the vinylsilyl-containing-silyl groups are vinyltrimethoxysilane (KBM-1003), vinyltriethoxysilane (KBE-1003).

And further, a silane compound having vinyl groups such as vinyltriacetoxysilane (Z-6075) (all of them are trade name and are available from Dow Corning Toray Co., Ltd.) may be exemplified.

When the alkoxysiloxane having the unsaturated groups or the vinylsilyl-containing-silyl groups is specifically the silane compound having amino groups and alkoxy groups such as aminoalkyl trialkoxysilane or aminoalkyl aminoalkyl trialkoxysilane, the amino groups thereof is easier to react to the surface-exposed reactive groups of the first dielectric substrate 15 and the first electrode 16 and the second electrode 14 than the alkoxy groups of the alkoxysiloxane having the plural vinyl groups. Therefore the surface modification is competitively prioritized.

The silane compounds having the amino groups and the alkoxy groups are not restricted, as long as they can modify the surface by reacting to the surface-exposed reactive groups of the first dielectric substrate 15 and the first electrode 16 and the second electrode 14. As Examples of them, aminoalkyl aminoalkyl trialkoxysiloxane, specifically, $H_2N—(C_pH_{2p})—N—(C_qH_{2q})—Si(—OC_rH_{2r+1})_3$ (p, q, r are independently a number of 1-6), more preferably aminoethylaminopropyl trimethoxysilane (p=2, q=3, r=1) are exemplified.

The alkoxysilane having the vinyl groups are not restricted, as long as they can improve the modified portions by the alkoxysiloxane having the unsaturated groups or the vinylsilyl-containing-silyl groups. Examples of them are $R^2(OR^1—)_2—Si—O—[(CH_2=CH—)(OR^1—)Si—O]_n—Si(—OR^1)_2R^3$ (in the formula, n is a number of 1-20, $R^1$ is $C_aH_{2a+1}$ and a thereof is a number of 1-3, $R^2$ and $R^3$ is $CH_3$ or $CH_2=CH$), more specifically, a silane coupling agent having the vinyl groups represented by the formula (n is a number of 1-5, a is a number of 1-3, $R_2$ is $CH_3$, $R_3$ is $CH_2=CH$).

The alkoxysiloxane having the unsaturated groups or the vinylsilyl-containing-silyl groups and the alkoxysiloxane having the vinyl groups may be used as the molecular adhesive. For example, they may be independently used as two liquid parts or may be mixed to be used as one liquid part. It is preferable that a ratio of usage or a ratio of mixture in the composition is 1-0.1:1 by weight.

When one of the surfaces of the bonding sides of the first dielectric substrate 15 and the first electrode 16 and the second electrode 14 is amplified by those alkoxysilane having the vinyl groups, other of surfaces of the bonding sides of the first dielectric substrate 15 and the first electrode 16 and the second electrode 14 may be amplified with those alkoxysilane having the vinyl groups or may be amplified by organic aluminate, inorganic aluminate, organic titanate, inorganic titanate, a triazine ring-containing compound, a silane coupling agent such as $CH_2=CH—Si(—OCH_3)_3$ (vinylmethoxysiloxane: VMS), $CH_2=CH—Si(—OC_2H_5)_3$, $CH_2=CH—Si(—OC_3H_7)_3$ for improving reactivity thereof.

As organic aluminate and/or organic titanate, examples of them are compounds which are schematically presented with:

p units of a repeating unit of $—\{O—Si(-A^1)(-B^1)\}—$, q units of a repeating of $—\{O—Ti(-A^2)(-B^2)\}—$, and r units of a repeating of $—\{O—Al(-A^3)\}-$ (in each repeating unit, p and q are a number of 0 or 2-200, r is a number of 0 or 2-100 and p+q+r>2, $-A^1$, $-A^2$ and $-A^3$ are any one of $—CH_3$, $—C_2H_5$, $—CH=CH_2$, $—CH(CH_3)_2$, $—CH_2CH(CH_3)_2$, $—C(CH_3)_3$, $—C_6H_5$ and $—C_6H_{12}$, or a reactive group which forms the covalent bond and is selected from the group consisting of $—OCH_3$, $—OC_2H_5$, $—OCH=CH_2$, $—OCH(CH_3)_2$, $—OCH_2CH(CH_3)_2$, $—OC(CH_3)_3$, $—OC_6H_5$ and $—OC_6H_{12}$, $—B^1$ and $—B^2$ are either $—N(CH_3)COCH_3$ or $—N(C_2H_5)COCH_3$, or a reactive group which forms the covalent bond and is selected from the group consisting of $—OCH_3$, $—OC_2H_5$, $—OCH=CH_2$, $—OCH(CH_3)_2$, $—OCH_2CH(CH_3)_2$, $—OC(CH_3)_3$, $—OC_6H_5$, $—OC_6H_{12}$, $—OCOCH_3$, $—OCOCH(C_2H_5)C_4H_9$, $—OCOC_6H_5$, $—ON=C(CH_3)_2$ and $—OC(CH_3)=CH_2$, at least any one of $-A^1$, $-A^2$, $-A^3$, $—B^1$ and $—B^2$ in the repeat units is the reactive group when p, q and r are a positive number). The compounds having the repeating units may be prepared by block copolymerization or random copolymerization. The compounds may be an aluminate coupling agent such as an organic aluminate and an inorganic aluminate, or a titanate coupling agent such as an organic titanate and an inorganic titanate As the triazine ring-containing compound, specific examples are:

a compound having an amino group such as triethoxysilylpropylamino-1,3,5-triazine-2,4-dithiol (TES), aminoethylaminopropyltrimethoxy silane;

a triazine compound having a trialkoxysilylalkylamino group such as a triethoxysilylpropylamino group and a mercapto group or an azide group, a triazine compound represented by following Formula (1)

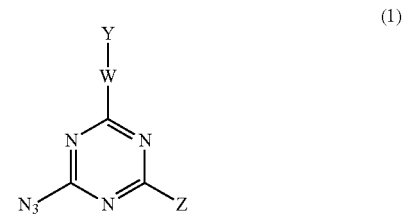

(in the Formula (1), wherein W may be a spacer group, for example, an alkylene group or an aminoalkylene group optionally having a substituted group or may be directly bonded; Y is an hydroxyl group or a reactive functional group which generates an hydroxyl group by hydrolysis or cleavage, for example, the trialkoxyalkyl group; $—Z$ is $—N_3$ or $—NR^1R^2$ ($R^1$ and $R^2$ are the same or different, and are H or an alkyl group, or $—R^3Si(R^4)_m(OR^5)_{3-m}[R^3$ and $R^4$ are an alkyl group, $R^5$ is H or an alkyl group, m is 0 to 2]), and incidentally the alkylene group, alkoxy group and alkyl group are the chained, branched and/or cyclic hydrocarbon group having 1 to 12 carbon atoms which optionally has a substituted group), for example 2,6-diazido-4-{3-(triethoxysilyl)propylamino}-1,3,5-triazine (P-TES);

a thiol compound having a trialkoxysilylalkyl group, for example, a thiol compound having trialkoxysilylalkyl group;

an epoxy compound having an alkoxysilyl group, for example, an epoxy compound having a trialkyloxysilylalkyl group;

a triazine compound having at least one of an alkoxysilyl group, a mercapto group, an azide group;

an amine compound having an alkoxysilyl group, for example, N-(3-(trimethoxysilyl) propyl)ethylenediamine.

The second dielectric substrate 13 is a hardened material from a composition containing rubber ingredients.

The rubber ingredients in the composition containing the rubber ingredients for forming the second dielectric substrate 13 has unsaturated groups or vinylsilyl-containing-silyl groups. Thereby, thus reactive crosslinking groups exist on the surface of the second dielectric substrate 13.

When the second dielectric substrate 13 is prepared from the composition containing the rubber ingredients and is made from the rubber or the resin exemplified for the above-mentioned first dielectric substrate 15 in which the rubber ingredients do not have thus reactive crosslinking groups, the surface of the second dielectric substrate 13 may have thus reactive crosslinking groups as well as the first dielectric substrate 15 which is improved or further amplified.

The bonding portion of the first dielectric substrate 15 or the electrode 14 and the second dielectric substrate 13 is chemically crosslinked and bonded to the first dielectric substrate 15 through the chemical bonds by bonding on the surfaces of those substrates and/or the reactive crosslinking groups which exist on the surfaces thereof.

For example, when the functional groups such as original unsaturated groups of the first dielectric substrate 15 or the unsaturated groups or the vinylsilyl-containing-silyl groups bonding to the first dielectric substrate 15 or the second electrode 14, and the reactive crosslinking groups of the first dielectric substrate 15 or the reactive crosslinking groups in the rubber ingredient of the first dielectric substrate 15 are chemically crosslinked and bonded by the chemical bonds, addition crosslinking to the unsaturated functional groups, condensation crosslinking, open-ring addition crosslinking and the combination thereof may be used. The combination of holding the catalyst such as the platinum catalyst or the rhodium catalyst and thus crosslinking may be used.

More concretely, one grouping of the original functional groups of the first dielectric substrate 15 and the unsaturated groups or the vinylsilyl-containing-silyl groups on the surfaces of the first dielectric substrate 15 and the second electrode 14, and other grouping of the reactive crosslinking groups of the first dielectric substrate 15 or in the rubber ingredient for the first dielectric substrate 15 may be combination of the unsaturated groups such as the vinyl group as either of one grouping and the hydrosilyl groups as another grouping.

The second dielectric substrate 13, which is a hardened material from a composition containing rubber ingredients and covers the second electrode 14 along with the first dielectric substrate 15, is hardened by carrying out molecular adhesion and crosslinking cure simultaneously.

Figure 3:
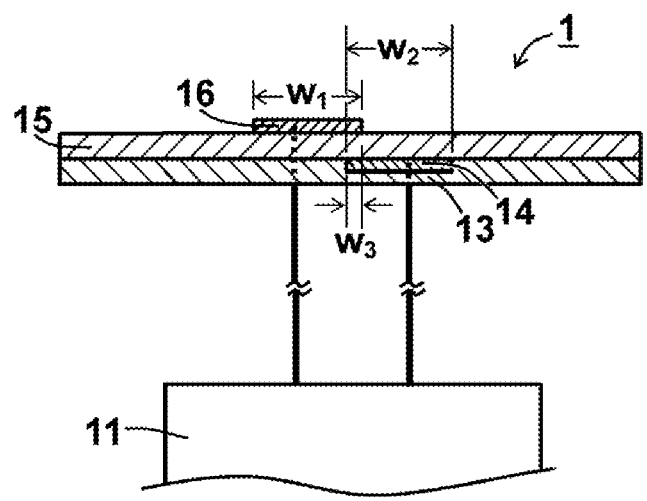
FIG. 3 is a schematic cross-sectional view of the other airflow generation device of the present invention.

As shown in FIGS. 1 and 2, the embodiment of the airflow generation device, of which the first electrode 16 and the second electrode 14 are not barely overlapped. However, as shown in FIG. 3, the first electrode 16 and the second electrode 14 may be provided to be overlapped with breadth $W_3$ equally. In this case, as regards the first electrode 16 and the second electrode 14, it is preferable that the overlapped breadth $W_3$ is five tenth or less of the respective breadth of the electrodes 16 and 14 towards the breadth of $W_1$ of the first electrode and W2 of the second electrode. If the electrodes are overlapped over this range, the approximately symmetrical airflow S (see FIG. 1) is generated on the electrodes to have a deteriorating effect on attracting the wind.

Figure 4:
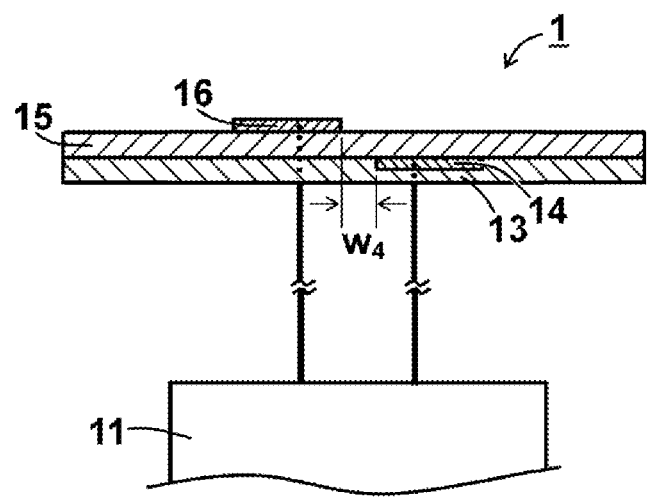
FIG. 4 is a schematic cross-sectional view of the other airflow generation device of the present invention.

As shown in FIG. 4, the first electrode 16 and the second electrode 14 of the airflow generation device 1 may be provided to have a space of breadth of $W_4$ along an orthogonal direction against a stepped direction thereof. If the length between the first electrode 16 and the second electrode 14 becomes too broad, the plasma discharge is difficult to be generated.

Figure 5:
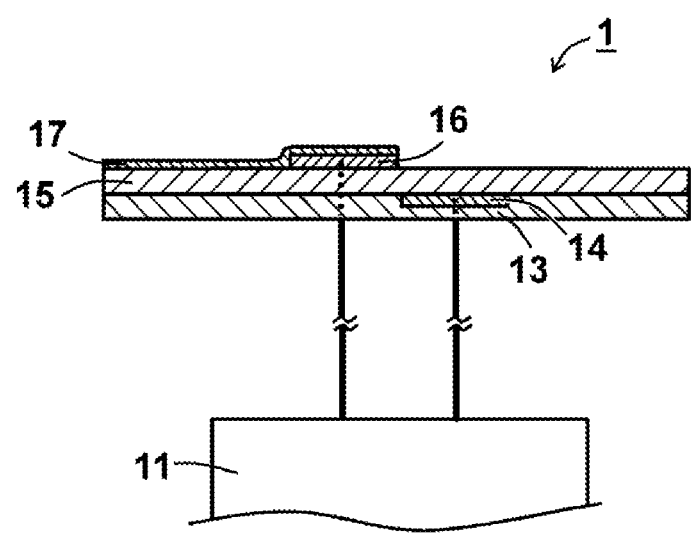
FIG. 5 is a schematic cross-sectional view of the other airflow generation device of the present invention.

As shown in FIG. 5, in the airflow generation device 1, the first electrode 16 may be protected with a coating layer or a film layer 17. When the electrode is protected therewith, it prevents the occurrence of the dings caused by hitting hails, hailstones, birds, or insects and is hard to cause the disconnection or the breakage in a case for outdoor use. When the coating layer or the film layer 17 makes the edge of the first electrode 16 toward the second electrode expose, it is preferable that the plasma discharge is easy to be generated.

Figure 6:
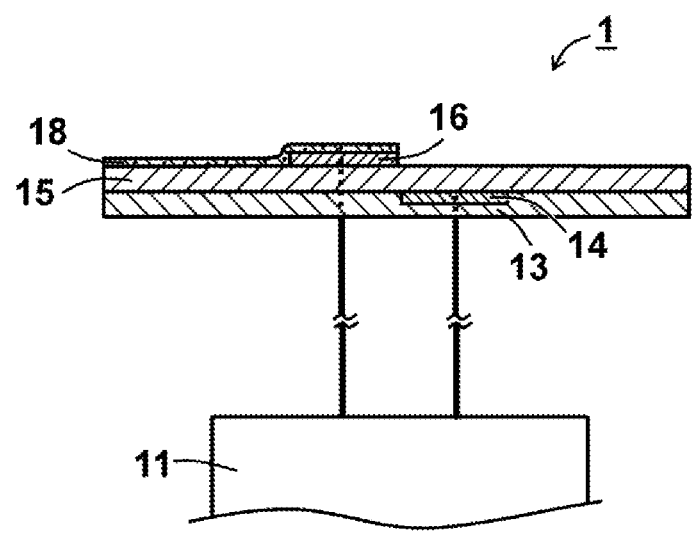
FIG. 6 is a schematic cross-sectional view of the other airflow generation device of the present invention.

As shown FIG. 6, in other embodiment of the airflow generation device 1, the first electrode 16 may be protected with a conductive rubber material-covered layer 18 which is formed with a conductive rubber material and doubles as the above-mentioned coating layer or coating film. When the electrode 16 is protected with the conductive rubber material-covered layer 18, a conductivity property can be compensated by the conductive rubber material-covered layer 18 in cases where the electrode 16 as the conductive material such as a metal layer is disconnected by dings or cleavages caused by hitting hails, hailstones, birds, or insects or the electrode 16 as the conductive material such as a metal plate is disconnected by a fracture or a rupture caused by metal fatigue due to wrapping or creeping.

Figure 7:
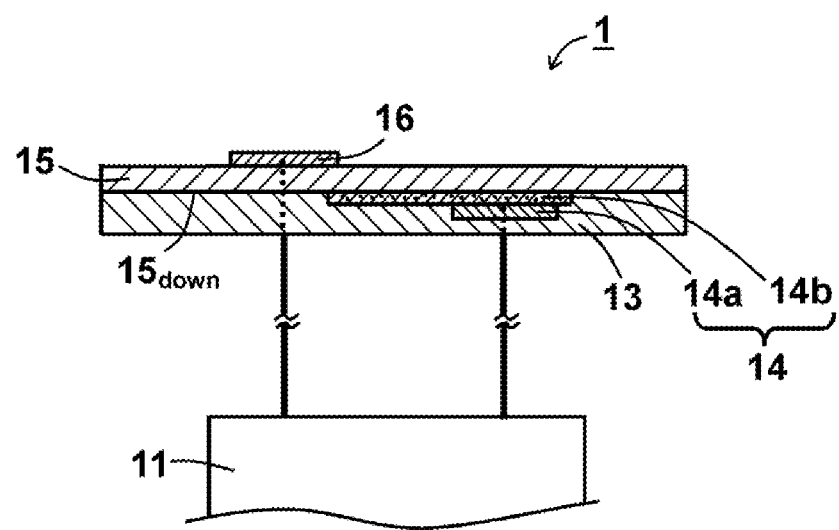
FIG. 7 is a schematic cross-sectional view of the other airflow generation device of the present invention.

And as shown in FIG. 7, in the other embodiment of the airflow generation device 1, the second electrode 14 may comprise a metal electrode layer 14a which consists of a metal layer or a metal plate staying away from the first electrode, and a conductive synthetic resin material-electrode layer 14b which is provided at a side of a back surface $15_{down}$ of the first dielectric substrate 15 and is provided to be attached to the metal electrode layer 14a at a side of an opposite surface thereof and consist of a conductive rubber layer or a conductive resin layer expanding to the side of the first electrode 16 beyond the metal electrode layer 14a. The first electrode 16 and the second electrode 14 are arranged so that an inner edge face (i.e. a right edge face in the figure) of the first electrode 16 which is along a longer direction (i.e. a front-back direction of a plane of the paper) is located at a just above direction (i.e. an upper direction of a thickness direction in the figure) of an inner edge face (i.e. a left edge face in the figure) of the conductive synthetic resin material-electrode layer 14b which is along a longer direction (i.e. above-mentioned one), as well as FIGS. 1 and 2.

The first electrode 16 and the conductive synthetic resin material-electrode layer 14b of the second electrode 14 may be partially overlapped or may have a space as well as FIGS. 2 and 3. When the second electrode 14 consists of the metal electrode layer 14a and the conductive synthetic resin material-electrode layer 14b, a conductivity property can be compensated in cases where the second electrode 14 as the conductive material such as the metal layer or the metal plate is disconnected by a fracture or a rupture caused by metal fatigue due to wrapping or creeping so that a current does not interrupt from an electric source unit 11 due to the conductive synthetic resin material-electrode layer 14b.

Figure 8:
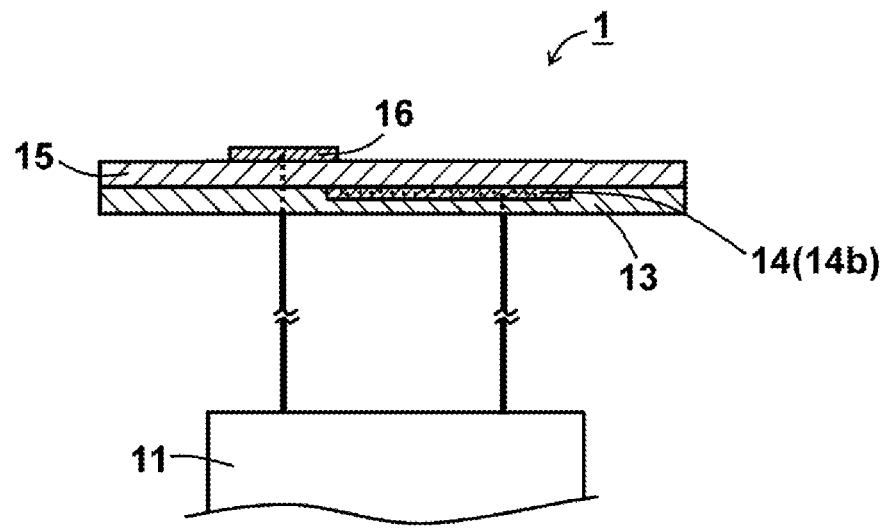
FIG. 8 is a schematic cross-sectional view of the other airflow generation device of the present invention.

As shown in FIG. 8, in the other embodiment of the airflow generation device 1, the second electrode 14 may consist of the conductive synthetic resin material-electrode layer 14b. Although the conductive synthetic resin material-electrode layer 14b is partially overlapped with the first electrode 16 in FIG. 8, they may be partially overlapped or may have a space as well as FIGS. 2 and 3.

And when the second electrode 14 consists of the metal electrode layer 14a and the conductive synthetic resin material-electrode layer 14b, the second electrode 14 and the conductive synthetic resin material-electrode layer 14b are bonded by molecular bonding as mentioned above.

Figure 9:
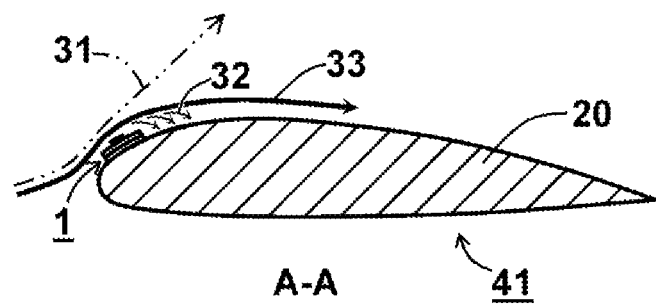
FIG. 9 is a perspective view which shows the airflow generation device attached onto the subjected object to be used.

For example, the airflow generation device 1 is used as shown in FIG. 9 so that it is provided on to blades of a wind-power generation apparatus 40. A nacelle 43 is provided on the top of a tower 44 erected on the ground. Three blades 41 are provided around a rotatable hub 42 which is projected from the nacelle 43. The electric source unit 11 (see FIG. 1) integrating a power circuit and a power control circuit is put in the nacelle 43 or the hub 42. And an angle adjustor for the blades 41, and an electric generator (not shown) which is connected up to a speed increaser, a brake gear and a transmission axis to an axis of the hub 42, are put therein. The airflow generation device 1, whose length L is approximately as same as the blades 42, is installed nearby an anterior boundary of the blades 4.

Figure 10:
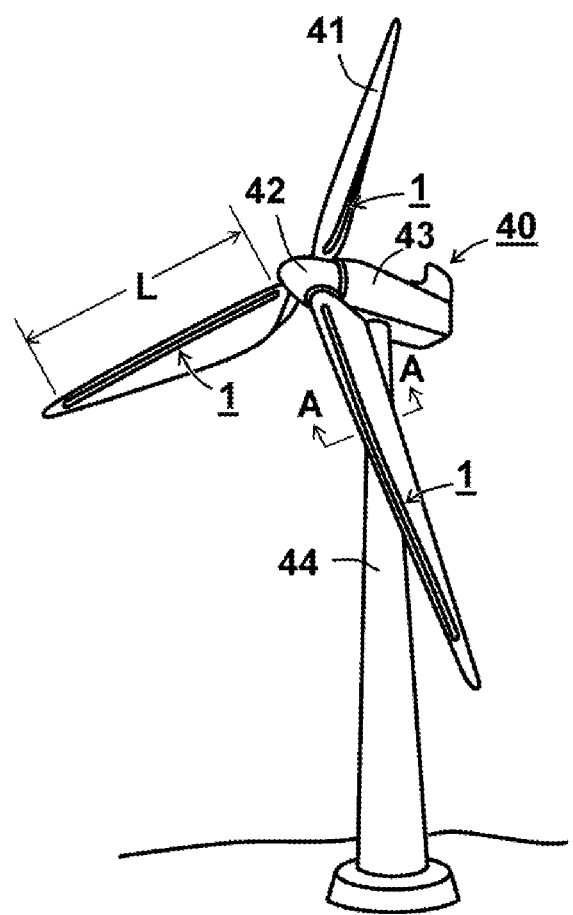
FIG. 10 is a schematic cross-sectional view which shows the airflow generation device attached onto the subjected object to be used.

As shown in FIG. 9 of an arrow view which shows A-A in FIG. 10 of the wind-power generation apparatus, the blades 41 are the subjected objects 20. If the airflow generation device is not installed thereon, the wind 31 flows as a quited flow so as to make the flow quited from neighborhood of the anterior boundary of the blades 41 according to an arrow of a chain double-dashed line. However, when the airflow generation device is installed thereon, an airflow 32 accomplished by the plasma discharge is generated, and the wind is pulled in so as to flow along the surface of the blades 41 according to an arrow of a solid line.

The airflow generation device 1 as shown in FIGS. 1-5, for example, is manufactured as follows.

First of all, a first dielectric substrate 15 is formed as a sheet-like shape from a silicone rubber or an ethylene-propylene-diene rubber having unsaturated groups. Next, one side of the first electrode 16 is beforehand treated with a surface activating treatment such as a corona discharge treatment, a plasma treatment, an ultraviolet treatment or an excimer treatment. Therefore surface-exposed reactive groups as reactive function groups such as hydroxyl groups, carboxyl groups and/or carbonyl groups are newly produced to be amplified so as to be exposed while scattering. A compound having unsaturated groups or the vinylsilyl-containing-silyl groups is reacted with the surface-exposed reactive groups produced on the first electrode 16 to bond the unsaturated groups or vinylsilyl-containing-silyl groups at a side (a side of a first surface $15_{up}$) of a bonding surface with the first dielectric substrate 15. If necessary, the first electrode 16 and a first dielectric substrate 15 are beforehand treated with the surface activating treatment such as the corona discharge treatment, the plasma treatment, the ultraviolet treatment or the excimer treatment at sides of bonding surfaces thereof. The first electrode 16 and the first dielectric substrate 15 are simply contacted to be piled or are contacted and piled under a pressurized or reduced pressure to be chemically bonded through the unsaturated groups or vinylsilyl-containing-silyl groups, each other.

Next, both surfaces of a second electrode 14 are beforehand treated with a surface activating treatment such as a corona discharge treatment, a plasma treatment, an ultraviolet treatment or an excimer treatment to produce surface-exposed reactive groups such as hydroxyl groups and so on. A compound having unsaturated groups or vinylsilyl-containing-silyl groups is reacted with the surface-exposed reactive groups produced on the second electrode 14 to bond the unsaturated groups or the vinylsilyl-containing-silyl groups at a side (a side of a second surface $15_{down}$) of a bonding surface with the first dielectric substrate 15. If necessary, the second electrode 14 and the first dielectric substrate 15 are beforehand treated with the surface activating treatment such as the corona discharge treatment, the plasma treatment, the ultraviolet treatment or the excimer treatment at sides of bonding surfaces thereof. The second electrode 14 and the first dielectric substrate 15 are simply contacted to be piled or are contacted and piled under a pressurized or reduced pressure to be chemically bonded through the unsaturated groups or the vinyl-containing-silyl groups, each other.

Furthermore, the second electrode 14 and the first dielectric substrate 15 are treated with a surface activating treatment such as a corona discharge treatment, a plasma treatment, an ultraviolet treatment or an excimer treatment at the side of the second surface $15_{down}$. And then a compound having reactive crosslinking groups are reacted to surface-exposed activated groups produced thereon to bond the reactive crosslinking groups. Or further, if necessary, they are immersed or applied with a solution or a suspension including a platinum catalyst or a rhodium catalyst to hold the catalyst.

After that, a composition including rubber ingredients, which is used for carrying out molecular-bonding of the second electrode 14 and the first dielectric substrate 15 and vulcanization-curing thereof at the side of the second surface $15_{down}$, is prepared. The composition including the rubber ingredients is carried out with applying-processing or molding-processing to be cured so as to cover the second electrode 14 along with the first dielectric substrate 15 in order to produce a hardened material. Herewith, a second dielectric substrate 13 is formed, and an airflow generation device is obtained.

A subjected object, which moves in the air relatively, is bonded at a side of an exposed surface of the second dielectric substrate 13 by using an adhesive, or molecular bonding as well as mentioned above.

Incidentally, when the first dielectric substrate 15 and the first electrode 16 and the second electrode 14 are bonded, those bonding surfaces are treated with a surface activating treatment such as a corona discharge treatment, a plasma treatment, an ultraviolet treatment or an excimer treatment and then they are piled under normal pressure and may be bonded through covalent bonds under normal pressure. However, they may be bonded through covalent bonds under a pressurized or reduced pressure. Approaching between the surface-exposed reactive groups such as the hydroxyl groups and the alkoxysilane having the unsaturated groups or the vinylsilyl-containing-silyl groups or the reactive groups of the alkoxysiloxane having plural vinyl groups is accelerated by removing a gas medium from the contacted interfaces thereof under conditions of a reduced or vacuum pressure, for example, a reduced condition of 50 torr or less, concretely 50-10 torr, or a vacuum condition of less than 10 torr, concretely less than 10 torr to $1\times10^{-3}$ torr, preferably less than 10 torr to $1\times10^{-2}$ torr or by applying a stress (load) to the contacted interfaces thereof under conditions of for example 10-200 kgf, or by further heating the contacted interfaces thereof.

The corona discharge treatment, which is treated to the side of bonding surface between the first dielectric substrate 15 and the first electrode 16 and the second electrode 14, is conducted under the conditions of e.g. power source: AC 100 V, output voltage: 0 to 20 kV, oscillating frequency: 0 to 40 kHz for 0.1 to 60 seconds, and temperature: 0 to 60 deg C. by using an apparatus for an atmospheric pressure corona surface modification (trade name of Corona Master which is available from Shinko Electric & Instrumentation Co., Ltd.). The corona discharge treatment may be conducted to the face wetted with water, alcohols, acetones or esters etc.

The surface activating treatment which is treated to the side of bonding surface between the first dielectric substrate 15 and the first electrode 16 and the second electrode 14, may be an atmospheric pressure plasma treatment and/or an ultraviolet irradiation treatment (a well-known UV treatment which generates ozone by an UV irradiation treatment and an excimer treatment).

The atmospheric pressure plasma treatment is conducted under conditions of e.g. plasma processing speed: 10 to 100 mm/s, power source: 200 or 220 V AC (30 A), compressed air: 0.5 MPa (1 NL/min.), and 10 kHz/300 W to 5 GHz, electric power: 100 to 400 W, and irradiation period of time: 0.1 to 60 seconds by using an air plasma generator (trade name of Aiplasma which is available from Panasonic Corporation).

The ultraviolet irradiation treatment is conducted under conditions of e.g. 50 to 1500 mJ/cm² of the cumulative amount of light by using an excimer rump optical source (trade name of L11751-01 which is available from Hamamatsu Photonics K.K.).

Incidentally, embodiments using the compound having the unsaturated groups or vinylsilyl-containing-silyl groups or the compound having the reactive crosslinking groups are explained as the molecular adhering technology, above. However, molecular adhesive, which is employed with co-existing alkoxysiloxane having vinyl groups and is used to be immersed, applied or sprayed as a coating treatment therewith, may be used. By thus treatments, alkoxysiloxane having reactive functional groups which has unsaturated groups are bonded to the surface-exposed activated groups such as hydroxyl groups, the carboxyl groups and the carbonyl groups through the covalent bonds such as the ether bonds or the ester bonds. Thereby, the surface-exposed reactive groups having low reactivity are surface-modified by the alkoxysiloxane having the reactive functional groups which has high reactivity. Consequently, the alkokysilyl groups derived from the alkoxysiloxane having the reactive functional groups are exposed from the surfaces, and for example, the mono-molecular layer is formed thereby. Therefore, the surfaces of the first dielectric substrate 15 and the first electrode 16 and the second electrode 14 are modified thereby. After that, the alkoxysilyl groups of the alkoxysiloxane having the vinyl groups are reacted to the alkoxysilyl groups on the modified portions, to bond them through new siloxy bonds by an alcohol reaction. And then, one group among the surface-exposed reactive groups having the low reactivity is amplified with the plural vinyl groups having the high reactivity derived from the alkoxysiloxane having the vinyl group, and for example, the mono-molecular layer is formed thereby.

As the results, the amplified portions, where the plural vinyl groups are exposed from the first dielectric substrate 15 and the first electrode 16 and the second electrode 14, are formed. If necessary, the exposed surfaces of the amplified portions are treated with the corona discharge treatment, the plasma treatment, the ultraviolet treatment and/or the excimer treatment, further amplified portions where the silanol groups or the silyl groups are produced. The silanol groups and the silyl groups are produced by oxidative cleavage of at least a part or all of the vinyl groups. Furthermore, the platinum catalyst or the rhodium catalyst may be held thereon.

The airflow generation device 1 may be manufactured by following ways. The first dielectric substrate 15 and the first electrode 16 and the second electrode 14 are respectively brought into contact, or the first dielectric substrate 15 with the second electrode 14 and the composition including the rubber ingredients for molecular-adhering the first dielectric substrate 15 and vulcanization-curing thereof are brought into contact.

Incidentally, the airflow generation device 1 shown in FIGS. 6-8 is manufactured as well as the airflow generation device 1 shown in FIGS. 1-5.

Embodiments

Airflow generation devices 1 of Examples which apply the present invention were manufactured as shown in below Examples 1-3, and the physical properties were evaluated.

Example 1

The airflow generation device 1 as shown in FIGS. 1 and 2 was manufactured as follows.

For the electrodes, the first electrode 16 and the second electrode 14, which were made of titanium and treated with removing grease therefrom, were used. The electrodes 16, 14 were carried out with the corona discharge treatment as the surface treatment. Thereby, hydroxyl groups were produced on the first electrode 16 and the second electrode 14. Then they were immersed into the solution of a silyl compound having vinyl groups such as $(CH_2=CH-)(CH_3O-)_2Si-O-[(CH_2=CH-)(CH_3O-)Si-O]_{n1}-Si(-OCH_3)_2(-CH=CH_2)$ ($n1=1-30$), and treated with heat, to react the silyl compound having the vinyl groups with the hydroxyl groups on the first electrode 16 and the second electrode 14.

The first electrode 16 and the second electrode 14 whose hydroxyl groups were reacted with the silyl compound having the vinyl groups and a first dielectric substrate 15 (silicone rubber having vinyl groups; product number: SH851US which was available from Dow Corning Toray Co., Ltd.) as a rubber sheet were treated with a corona discharge treatment under the same condition as mentioned above in order to be carried out with an activating treatment for their surface. The first electrode 16, the first dielectric substrate 15 and the second electrode 14 were piled in the order, and were thermal-compressed under a pressing condition of at 80 deg C., for 5 min. and at 70 kgf, to prepare an adhered object of the first dielectric substrate 15 and the first electrode 16 and the second electrode 14.

The adhered object of the first dielectric substrate 15 and the first electrode 16 and the second electrode 14 were immersed into a hexane solution of a catalyst including platinum such as a platinum complex of platinum-tetramethyl-divinyl-disiloxane, and dried, to prepare the adhered object of the first dielectric substrate 15 and the first electrode 16 and the second electrode 14. The catalyst including platinum was held on the exposed surface of the second surface $15_{down}$ of the first dielectric substrate 15 and the exposed surface of the second electrode 14. Although the chemical structure thereof is not entirely obvious, it seems that platinum atoms of the platinum complex are coordinated to the silyl groups having the plural vinyl groups produced on the surfaces of the adhered object.

An additive crosslinking silicone rubber material composition (liquid-type two-ingredients of silicone rubber; product number: KE-1950-50 which was available from Shin-Etsu Chemical Co., Ltd.) was applied onto the adhered object holding the catalyst including platinum thereon of the first dielectric substrate 15 and the first electrode 16 and the second electrode 14 at the exposed surface of the second surface $15_{down}$ of the first dielectric substrate 15 and the exposed surface of the second electrode 14, and was pressed and heated to cure. Then, the hydrosilyl groups of the polysiloxane having the hydrosilyl groups were more preferentially reacted than additive crosslinking polymerization by hydrosilylation to the double bonds of the silicone rubber having vinyl groups on the exposed surface of the second surface $15_{down}$ of the first dielectric substrate 15 and the double bonds of the vinyl-containing-silyl groups on the exposed surface of the second electrode 14, to polymerize. The additive crosslinking silicone rubber for the second dielectric substrate 13 covered and adhered the adhered object holding the catalyst including platinum of the first dielectric substrate 15 and the first electrode 16 and the second electrode 14 above the exposed portion of the second surface $15_{down}$ of the first dielectric substrate 15 and the second electrode 14. As the results, the airflow generation device 1 as airflow control electrodes was obtained.

Example 2

The airflow generation device 1 as shown in FIG. 7 was manufactured as follows.

For the electrodes, the first electrode 16 and the metal electrode layer 14a for the second electrode 14, which were made of titanium and treated with removing grease therefrom, were used. The electrode 16 and the metal electrode layer 14a were carried out with the corona discharge treatment as the surface treatment under the same condition of Example 1. Thereby, hydroxyl groups were produced on the first electrode 16 and the metal electrode layer 14a. Then they were immersed into the solution of a silyl compound having vinyl groups such as $(CH_2=CH-)(CH_3O-)_2Si-O-[CH_2=CH-)(CH_3O-)Si-O]_{n1}-Si(-OCH_3)_2(-CH=CH_2)$ (n1=1-30), and treated with heat, to react the silyl compound having the vinyl groups with the hydroxyl groups on the first electrode 16 and the metal electrode layer 14a.

The first electrode 16 whose hydroxyl groups were reacted with the silyl compound having the vinyl groups and first dielectric substrate 15 as the same rubber sheet of Example 1 were treated with a corona discharge treatment under the same condition as mentioned in Example 1 in order to be carried out with an activating treatment on the surface. The first electrode 16 and the first dielectric substrate 15 were piled in the order from the top thereof, and were thermal-compressed under a pressing condition of at 80 deg C., for 5 min. and at 70 kgf, to prepare an adhered object of the first electrode 16 and the first dielectric substrate 15.

The second surface $15_{down}$ of the adhered object of the first electrode 16 which was made from a silicone rubber as a conductive rubber sheet and the dielectric substrate 15, and a conductive synthetic resin material electrode layer 14b (a conductive silicone rubber having vinyl groups; product number: KE-3711-U which was available from Shin-Etsu Chemical Co., Ltd.) were treated with a corona discharge treatment under the same condition as mentioned in Example 1 in order to be carried out with an activating treatment for the surface thereof. The adhered object of first electrode 16 and the first dielectric substrate 15, and the conductive synthetic resin material electrode layer 14b were piled in the order from the top thereof, and were thermal-compressed under a pressing condition of at 80 deg C., for 5 min. and at 70 kgf, to prepare an adhered object of the first dielectric substrate 15, the first electrode 16 and the conductive synthetic resin material electrode layer 14b.

The first dielectric substrate 15 in the adhered object of the first dielectric substrate 15, the first electrode 16 and the conductive synthetic resin material electrode layer 14b, and a metal electrode layer 14a whose hydroxyl groups were reacted with a silyl compound having vinyl groups were treated with a corona discharge treatment under the same condition as mentioned above in order to be carried out with an activating treatment for the surfaces. The metal electrode layer 14a was piled onto the first dielectric substrate 15 in the adhered object of the first dielectric substrate 15, the first electrode 16 and the conductive synthetic resin material electrode layer 14b, and were thermal-compressed under a pressing condition of at 80 deg C., for 5 min. and at 70 kgf, to prepare an adhered object of the first dielectric substrate 15, the first electrode 16, and the second electrode consisting of the conductive synthetic resin material electrode layer 14b and the metal electrode layer 14a.

The adhered object of the first dielectric substrate 15 and the first electrode 16 and the second electrode consisting of the conductive synthetic resin material electrode layer 14b and the metal electrode layer 14a were immersed into a hexane solution of a catalyst including platinum such as a platinum complex of platinum-tetramethyl-divinyl-disiloxane, and dried, to prepare the adhered object of the first dielectric substrate 15, the first electrode 16, and the second electrode consisting of the conductive synthetic resin material electrode layer 14b and the metal electrode layer 14a. The catalyst including platinum was held on the exposed surface of the second surface $15_{down}$ of the first dielectric substrate 15 and the exposed surface of conductive synthetic resin material electrode layer 14b, and the exposed surface of the metal electrode layer 14a. Although the chemical structure thereof is not entirely obvious, it seems that platinum atoms of the platinum complex are coordinated to the silyl groups having the plural vinyl groups produced on the surfaces of the adhered object.

An additive crosslinking silicone rubber as the same rubber of Example 1 was applied onto the adhered object holding the catalyst including platinum thereon of the first electrode 16, and the second electrode consisting of the conductive synthetic resin material electrode layer 14b and the metal electrode layer 14a, and was pressed and heated to cure. Then, the hydrosilyl groups of the polysiloxane having hydrosilyl groups were more preferentially reacted than crosslinking polymerization of the vinyl-containing-silyl groups each other by hydrosilylation to the double bonds of the vinyl-containing-silyl groups, to polymerize. The additive crosslinking silicone rubber covered and adhered onto the adhered object holding the catalyst including platinum of the first electrode 16 and the second electrode consisting of the conductive synthetic resin material electrode layer 14b and the metal electrode layer 14a above the exposed portion the second surface $15_{down}$ of the first dielectric substrate 15 and the exposed portions of the conductive synthetic resin material electrode layer 14b and the metal electrode layer 14a. As the results, the airflow generation device 1 as airflow control electrodes was obtained.

Example 3

The airflow generation device 1 as shown in FIG. 8 was manufactured as follows.

For the electrode, the first electrode 16, which was made of titanium and treated with removing grease therefrom, was used. The electrode 16 was carried out with the corona discharge treatment as the surface treatment under the same condition of Example 1. Thereby, hydroxyl groups were produced on the first electrode 16. Then it was immersed into the solution of a silyl compound having vinyl groups such as $(CH_2=CH-)(CH_3O-)_2Si-O-[(CH_2=CH-)(CH_3O-)Si-O]_{n1}-Si(-OCH_3)_2(-CH=CH_2)$ (n1=1-30), and treated with heat, to react the silyl compound having the vinyl groups to the hydroxyl groups on the first electrode 16.

The first electrode 16 whose hydroxyl groups were reacted with the silyl compound having the vinyl groups and first dielectric substrate 15 as the same rubber sheet as well as Example 1 were treated with a corona discharge treatment under the same condition as mentioned in Example 1 in order to be carried out with an activating treatment for the surface thereof. The first electrode 16 and the first dielectric substrate 15 were piled in the order from the top thereof, and were thermal-compressed under a pressing condition of at 80 deg C., for 5 min. and at 70 kgf, to prepare an adhered object of the tuber sheet 15 and the first electrode 16.

The second surface $15_{down}$ of the adhered object of the dielectric substrate 15, and the first electrode 16 and the second electrode 14 as a conductive synthetic resin material electrode layer 14b of the same electrode in Example 1 were treated with a corona discharge treatment under the same condition as mentioned in Example 1 in order to be carried out with an activating treatment for the surface thereof. The adhered object of the first dielectric substrate 15 and the first electrode 16, and the conductive synthetic resin material electrode layer 14b were piled in the order from the top thereof, and were thermal-compressed under a pressing condition of at 80 deg C., for 5 min. and at 70 kgf, to prepare an adhered object of the first dielectric substrate 15, the first electrode 16, and conductive synthetic resin material electrode layer 14b (the second electrode 14).

The exposed surface of the second surface $15_{down}$ of the first dielectric substrate 15 in the adhered object of the first dielectric substrate 15, the first electrode 16 and the conductive synthetic resin material electrode layer 14b, and the exposed surface of the conductive synthetic resin material electrode layer 14b were immersed into a hexane solution of a catalyst including platinum such as a platinum complex of platinum-tetramethyl-divinyl-disiloxane, and dried, to prepare the adhered object of the first dielectric substrate 15, the first electrode 16, and the conductive synthetic resin material electrode layer 14b on which the catalyst including platinum was held at the surface. Although the chemical structure thereof is not entirely obvious, it seems that platinum atoms of the platinum complex are coordinated to the silyl groups having the plural vinyl groups produced on the surfaces of the adhered object.

An additive crosslinking silicone rubber as the same rubber of Example 1 was applied onto the adhered object holding the catalyst including platinum thereon of the first dielectric substrate 15, the first electrode 16 and the conductive synthetic resin material electrode layer 14b, and was pressed and heated to cure. Then, the hydrosilyl groups of the polysiloxane having hydrosilyl groups were more preferentially reacted than crosslinking polymerization of the vinyl-containing-silyl groups each other by hydrosilylation to the double bonds of the vinyl-containing-silyl groups, to polymerize. The additive crosslinking silicone rubber covered and adhered onto the adhered object holding the catalyst including platinum of the first dielectric substrate 15, the first electrode 16 and the conductive synthetic resin material electrode layer 14b above the exposed portion the second surface $15_{down}$ of the first dielectric substrate 15 and the conductive synthetic resin material electrode layer 14b. As the results, the airflow generation device 1 as airflow control electrodes was obtained.

Those airflow generation devices 1 did not peel off and had excellent durability, because they had excellent light resistance or weather resistance and were strongly bonded by the molecular adhesion through the chemical bonds between the dielectric substrates and the electrodes after longtime usage. As regards the wind-power generation apparatus using the airflow generation device 1 as shown in FIG. 10, the flow of the wind was smoother and the efficiency of utilization of the wind was able to be significantly increased due to suppression of the quitting of the airflow on the blade as compared with a wind-power generation apparatus without using the airflow generation device. The friction noise was reduced when the rotating blade cuts the wind, therefore the apparatus was very quiet.

INDUSTRIAL APPLICABILITY

The airflow generation device of the present invention is attached to a broad range of the subjected object, for example, a fin or a fan of compact products such as home electric appliances, depressurization/pressurization air pumps and depressurization compressors, or large products such as blades for wind-power generation, vehicles, train cars, elevators, rockets or constructions, and is used for making the flow of the wind smooth. And the airflow generation device is used for inducing the wind against the blades, the fan or the fin efficiently, or for reducing the friction noise towards the air and for driving down the sound noise.

EXPLANATIONS OF LETTERS OR NUMERALS

Numerals mean as follows. 1: airflow generation device, 11: power source unit, 12a and 12b: connection wire, 13: second dielectric substrate, 14: second electrode, 14a: metal electrode layer, 14b: conductive synthetic resin material-electrode layer, 15: first dielectric substrate, $15_{up}$: first surface, $15_{down}$: second surface, 16 first electrode, 17: film layer, 18: conductive rubber material-covered layer, 20: subjected object, 31: wind, 32: airflow, 33: wind, 40: wind-power generation apparatus, 41: blade, 42: hub, 43: nacelle, S: airflow, $T_1$-$T_3$ and $T_{total}$: thickness, $W_1$-$W_4$: breadth, L: length.

What is claimed is:

1. An airflow generation device comprising:
  a first dielectric substrate that is made from a rubber elastic material,
  plural electrodes that are provided on the dielectric substrate, the plural electrodes including a first electrode provided on or near by a first surface of the first dielectric substrate, and a second electrode provided on a second surface as a different side surface from the first surface, and
  a second dielectric substrate made from a rubber elastic material so as to cover the second electrode,
  which makes airflows generated by plasma caused from partial gas near by the first surface of the first dielectric substrate through an applied voltage into the first electrode and the second electrode;
    bonding portions between the first electrode and the second electrode and the first dielectric substrate, and bonding portions between the second electrode and the second dielectric substrate are bonded by chemical bonds with chemically crosslinking through unsaturated groups or vinylsilyl-containing-silyl groups, and bonding portions between the first dielectric substrate and the second dielectric substrate are bonded by chemical bonds with chemically crosslinking through unsaturated groups or vinylsilyl-containing-silyl groups which bond to surface of those substrates and/or exist on the surface thereof, and
  wherein the second electrode comprises a conductive rubber layer or a conductive resin layer which extends to a side of the first electrode.

2. The airflow generation device according to claim 1, wherein the first dielectric substrate and the second dielectric substrate are respectively the rubber elastic material in which a composition including rubber ingredient is three-dimensionally network-crosslinked, and which are formed into an elastic sheet-like shape and are made from three-dimensionally crosslinked silicone rubber or three-dimensionally crosslinked ethylene-propylene-diene rubber.

3. The airflow generation device according to claim 1, wherein bonding portions between the second electrode and the first dielectric substrate and bonding portions between the second electrode and the second dielectric substrate are bonded by chemical bonds with chemically crosslinking, due to the rubber elastic material having unsaturated groups or vinylsilyl-containing-silyl groups.

4. The airflow generation device according to claim 1, wherein the chemical bonds are covalent bonds through unsaturated groups or vinylsilyl-containing-silyl groups.

5. The airflow generation device according to claim 1, wherein the unsaturated groups or vinylsilyl-containing-silyl groups exist in a molecule of the rubber elastic material and/or on the surface thereof respectively.

6. The airflow generation device according to claim 1, wherein the first electrode or the second electrode and the first dielectric substrate, and the first dielectric substrate and the second dielectric substrate are bonded by the chemical bonds with chemically crosslinking, on which the unsaturated groups or vinylsilyl-containing-silyl groups on the surfaces thereof hold a platinum catalyst or a rhodium catalyst.

7. The airflow generation device according to claim claim 1,
wherein at bonding portions between the first electrode and the second electrode and the first dielectric substrate, the unsaturated groups or vinylsilyl-containing-silyl groups make covalent bonds to dehydrogenated residues of hydroxyl groups on at least any one of surface of the first electrode and second electrode and the first dielectric substrate,
and at bonding portions between the first dielectric substrate and the second dielectric substrate, dehydrogenated residues of hydroxyl groups on the surface of the first dielectric substrate, or unsaturated groups or vinylsilyl-containing-silyl groups bonded on the surface thereof and/or existing on the surface thereof make covalent bonds.

8. The airflow generation device according to claim 1, wherein at least any one of surfaces of the first electrode, the second electrode and the first dielectric substrate is a corona treated surface, a plasma treated surface, an ultraviolet treated surface and/or an excimer treated surface.

9. The airflow generation device according to claim 1, wherein at least a part of the first electrode is protected with a coating layer or a film layer.

10. The airflow generation device according to claim 9, wherein the coating layer or the film layer is a layer made from a conductive rubber material.

11. The airflow generation device according to claim 1, wherein the airflow generation device is put at a side of a second surface of the second dielectric substrate onto a subjected object which moves in the air relatively.

12. A manufacturing method for the airflow generation device of claim 1, the method comprising: a step for bonding the electrodes and the dielectric substrates at bonding portions thereof by chemical bonds through the unsaturated groups or vinylsilyl-containing-silyl groups.

13. The manufacturing method for the airflow generation device according to claim 12,
further comprising;
a step for reacting the unsaturated groups or vinylsilyl-containing-silyl groups to the first electrode and the second electrode at a side of a bonding surface with the first dielectric substrate,
a step for applying the first electrode and the second electrode onto the first dielectric substrate at the side of the bonding surface, and for bonding by chemical bonds through the unsaturated groups or vinylsilyl-containing-silyl groups at bonding portions of the first electrode, the second electrode and the first dielectric substrate, and
a step for curing the rubber elastic material over the second electrode with the first dielectric substrate together on the second surface, and thereby bonding the second electrode and the second dielectric substrate, and the first dielectric substrate and the second dielectric substrate at binding portions thereof by chemical bonds through unsaturated groups or vinylsilyl-containing-silyl groups.

* * * * *